May 14, 1957 F. A. SHERMAN 2,792,095
CONSTANT TORQUE PULLEY
Filed Nov. 30, 1955 2 Sheets-Sheet 1
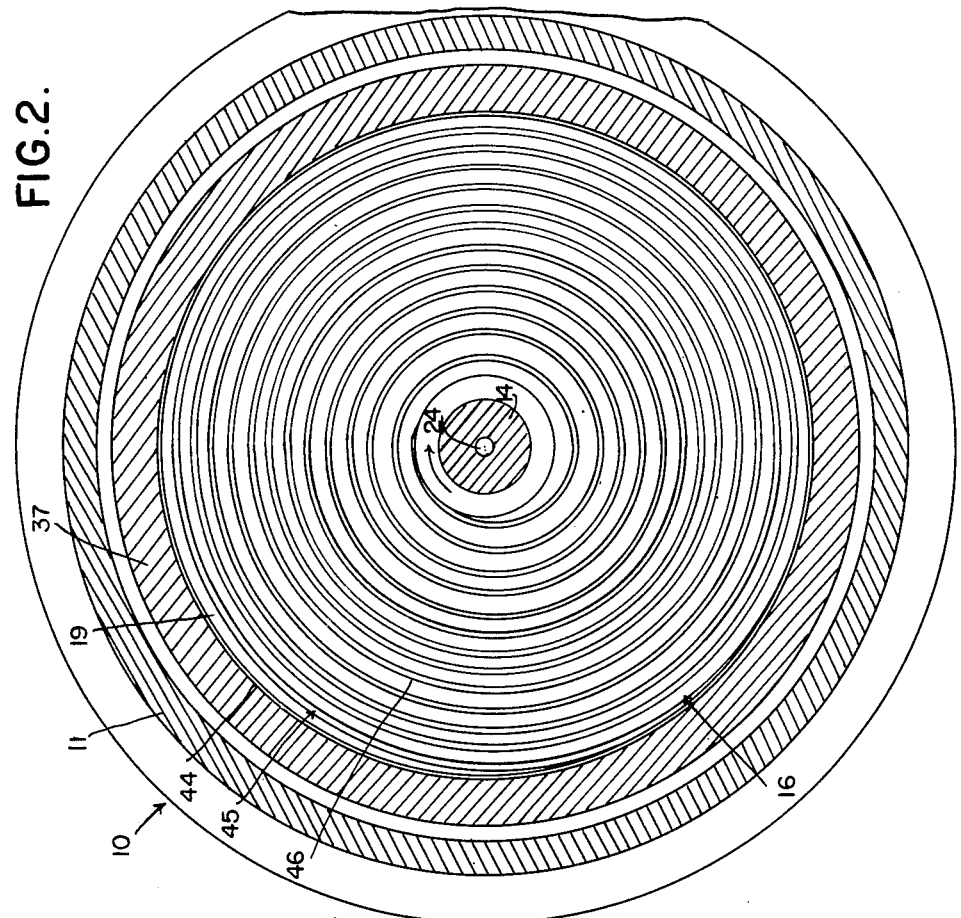
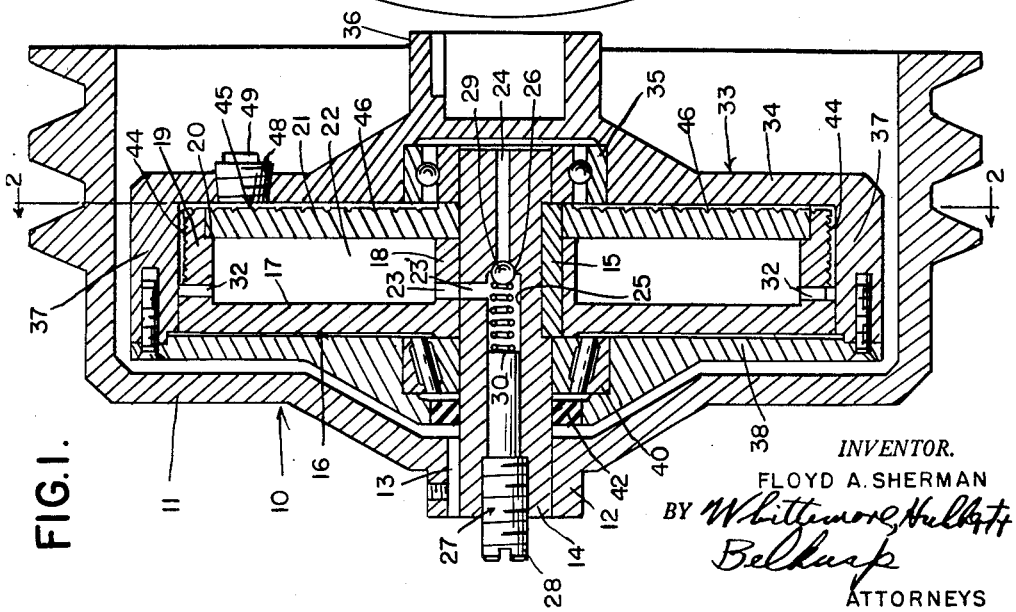
INVENTOR.
FLOYD A. SHERMAN
BY Whittemore, Hulbert
Belknap
ATTORNEYS May 14, 1957   F. A. SHERMAN   2,792,095
CONSTANT TORQUE PULLEY
Filed Nov. 30, 1955   2 Sheets-Sheet 2
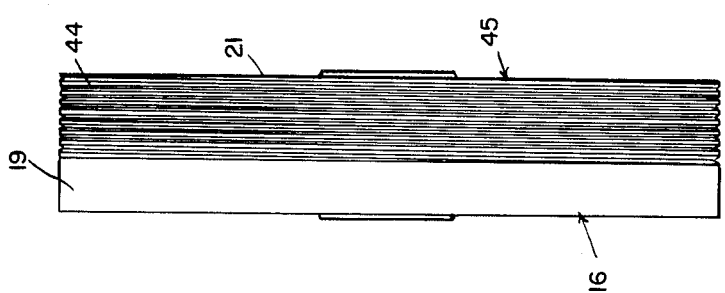
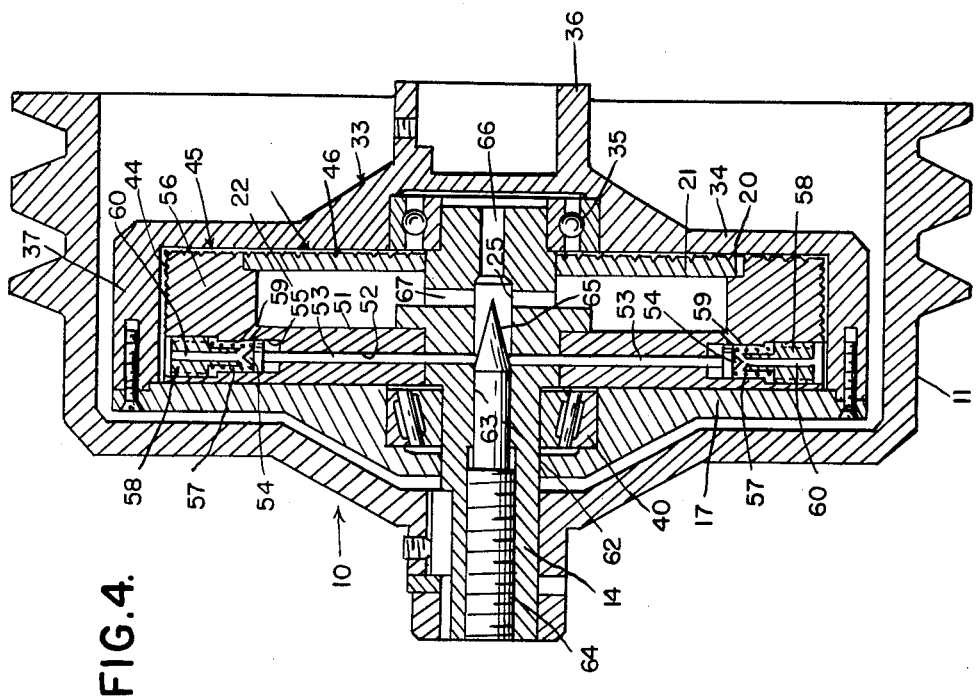
INVENTOR.
FLOYD A. SHERMAN
BY Whittemore, Hulbert
Belknap
ATTORNEYS United States Patent Office 2,792,095
Patented May 14, 1957

2,792,095

CONSTANT TORQUE PULLEY

Floyd A. Sherman, Birmingham, Mich., assignor to Motor Products Corporation, Detroit, Mich., a corporation of New York Application November 30, 1955, Serial No. 549,922

18 Claims. (Cl. 192—58)

The present invention relates to an improved device for the constant torque transmission of power, and as illustrated herein the device takes the form of a constant torque pulley to drivingly couple a small compressor, such as is used in an automotive air conditioning system, with a power source, namely the crank shaft of the automotive engine. However, the principles of the invention underlying such a pulley are applicable in any type of rotative power coupling by which it is desired to obtain a constant control of torque transmitted, in accordance with the requirement of the load, when the driver of the coupling varies considerably in speed.

A situation of this sort arises in the driving of an automotive air conditioner compressor, since the driving member of the coupling, as a member belt and pulley connected to the engine crank shaft, is capable in its higher speed ranges of furnishing torque far in excess of that required for the coupling to power the compressor with desired efficiency. Thus it is desirable that, when 2 H. P. is needed to drive the compressor efficiently, no more than 2 H. P. shall be applied through the output or driven member of the pulley device or coupling. At engine speeds operating the pulley input side in excess of this requirement there should be a slip action in the pulley to limit its output speed while still maintaining proper torque on the shaft by which the compressor is driven.

Conventional friction clutch arrangements possible of being attempted in a pulley having the foregoing requirements have decided drawbacks in their operation. These involve such factors as the need to dissipate much heat evolved in operation, to compensate for mechanical wear, to design the unit in an adequate diameter of its friction parts to handle the necessary torque, etc. Various types of hydraulic torque transmitting unit are available to the industry which to a greater or lesser degree avoid certain of these limitations. However, none affords the constancy of torque output under widely varying input speeds as does the construction contemplated by the present invention.

It is a general object of the invention to provide a constant torque transmission unit, taking its form as a constant torque pulley, which hydraulically transmits power at a reliably uniform speed not in excess of that desired for the most efficient operation of a unit powered by the pulley. The latter by-passes hydraulic liquid and slips automatically when the speed of its driving member exceeds that corresponding to the top speed of non-slip operation, and by-pass is terminated and the pulley returns to non-slip operation when synchronous speed of its input and output sides is resumed.

It is a further object of the invention to provide a constant torque device of the foregoing character which accomplishes the above result by centrifugal hydraulic action, the hydraulic liquid being displaced centrifugally with a force proportional to the speed of rotation of the driving member of the pulley. In a unit of this sort provision is made to apply the force axially in a novel controlled manner to drivingly couple a driven pulley member with the driving member, and to by-pass the hydraulic liquid when the force reaches a predetermined value, so as to maintain constant thereafter the axial coupling pressure.

It is a more specific object of the invention to provide a constant torque pulley hydraulically coupled under centrifugal force, as described, in which the driving member or rotor of the pulley provides a reservoir of substantial capacity for the hydraulic liquid, the reservoir opening radially outwardly to a centrifugal discharge zone at which the centrifugal driver rotor is encased by a driven housing member. More particularly, this encased zone includes a circumferential pressure control zone of substantial axial width around the periphery of the driving rotor, at which it has a limited radial clearance relative to the driven housing member, as well as a further radially extending, close tolerance pressure control zone along one side of the rotor leading back to the rotor reservoir. Thus there is provided a closed hydraulic circuit located entirely within the confines of the device.

A still further object of the invention is to provide a constant torque device of the sort described in the preceding paragraph, in which the circumferential and radial control zones are given a definite metering action in returning the hydraulic liquid to the reservoir space of the rotor. To this end, the circumferential zone or metering portion is defined by a continuous spiral groove formation, preferably described on the outer periphery of the rotor. This formation develops a substantial axial distance along the rotor periphery and then communicates with a further spiral groove metering formation, also preferably formed on the driving rotor, extending radially inwardly between the adjacent radial surfaces of the rotor and driven member.

In accordance with a further specific object of the invention, the metering path defined by the spiral formations leads inwardly to the reservoir space of the rotor past a further metering unit, by the adjustment of which the desired limiting output torque of the device may be determined.

In one embodiment of the invention, this unit takes the form of an adjustable, spring biased check element. In another embodiment the corresponding unit may take the form of an adjustable but rigidly sustained valve controlling the return hydraulic path between the spiral grooving and the reservoir.

The foregoing as well as other objects of the invention will become more apparent as this description proceeds especially in connection with the accompanying drawings, in which:

Fig. 1 is a view in axial section through a constant torque device or pulley in accordance with the invention;

Fig. 2 is a view in transverse vertical section along a line corresponding to the line 2—2 of Fig. 1, illustrating the metering grooving on a side face of the driving rotor of the device;

Fig. 3 is a view in side elevation of the rotor, showing its peripheral grooving; and Fig. 4 is a view in axial section similar to Fig. 1 illustrating a modified embodiment of the invention.

Referring to Figs. 1, 2 and 3 of the drawings, the improvement, in one adaptation thereof, is shown therein as embodied in a device 10 including a multiple belt pulley 11 having the usual external grooves by which it may be belt connected to a suitable prime mover, for example a pulley (not shown) on the crank shaft of an automotive engine. The pulley 11 may be considered illustrative of other types of rotating power input member of a torque transmission device following the principles of the invention.

The hub 12 of the pulley 11 is keyed at 13 in fixed driving relation to a power input shaft 14, and a further key 15 drivingly connects the shaft 14 with a hollow cylindrical driver rotor, generally designated 16, so that the rotor 16 rotates as a unit with pulley 11 as the latter is driven by the prime mover.

Although details of construction of the rotor 16 may vary, it is illustrated as made up of a cupped lefthand end casting or stamping having an axially extending hub 18 keyed to shaft 14, a radial wall 17, and an outer axially extending flange 19 extending from the wall in the same direction as hub 18. The flange 19 has an annular countersunk land 20 adjacent its free end, against which an end disk 21 may be force-fitted or otherwise secured to complete the rotor structure. This joint should be a liquid-tight one capable of confining in the annular reservoir 22 between the cupped end member and disk 16 a hydraulic liquid under the very substantial pressure to which this liquid is subjected in the operation of the device. The hydraulic liquid may be a suitable grade of oil of relatively high viscosity, capable of maintaining substantially constant viscosity up to a temperature of, say 450° F.

The hub 18 of the driver rotor 16 is provided with a radial port or passage 23 in direct and fixed communication with a similar radial passage 23' in the shaft 14, these passage portions opening to an axial bore extending from end to end through shaft 14. This bore includes a return intake portion 24 at the righthand end of the shaft, a counterbored portion 25 to which the radial passage 23 opens, the communication of bore intake portion 24 and counterbore 25 being through an annular valve seat 26, and an enlarged lefthand bore portion 27 which threadedly receives the head of an adjusting set screw 28. A ball check 29 is urged to engage the valve seat 26 by a coil compression spring 30 which abuts the inner end of the set screw 28.

The outer annular flange wall 19 of driver rotor 16 is provided with a plurality of centrifugal discharge ports 32 opening radially therethrough, there being two of these ports in diametrically opposed relation to one another in the embodiment of the invention shown, although the number and spacing may vary. The ports 32 are located adjacent the lefthand radial wall 17 of the rotor 16, leaving a substantial axial length of external surface of the flange 19 to the right of the ports 32. This length is contoured to provide a metering formation, to be described.

The remaining component of the device is a driven member, generally designated 33, in the form of a cylindrical housing encasing the driver rotor 16 with relatively close circumferential and radial clearances. Driven housing 33 may comprise a radially extending wall or web 34 located closely adjacent rotor 16 and provided with an internal counterbored axial recess in which a ball bearing 35 is disposed. This bearing journals the driven housing member 33 on the adjacent end of shaft 14. An integral drive coupling or fitting 36 projects axially outwardly from the wall 34 of driven member 33 to drivingly receive the shaft of a compressor or the like (not shown) to be powered through the device 10.

The housing wall 33 carries around its outer periphery an axially extending flange 37 which encases the axial flange 19 of rotor 16 with a relatively close tolerance; and the structure of the housing member 33 is completed by an end wall disk 38 secured by screws in liquid-tight relation to the flange 37. The wall 38 is positioned in a close tolerance spacing relative to the adjacent wall 17 of rotor 16. A roller type radial and end thrust bearing 40 disposed in a recess in the wall disk 38 journals the housing 33 in this zone for rotation on the shaft 14. A suitable annular seal 42 is applied between the wall 38 and shaft 14, outwardly of thrust bearing 40, to contain hydraulic liquid under considerable pressure.

As above stated, the centrifugal discharge ports 32 through the flange 19 of the driver rotor 16 open to the periphery of the rotor flange 19 adjacent the lefthand radial wall 17 of the rotor. They there communicate with an annular, circumferentially extending spiral groove 44 which provides the initial length of a continuous hydraulic pressure metering passage 45 between the adjacent, closely spaced surfaces of driver rotor 16 and driven housing 33.

As shown in Fig. 3, the circumferential groove portion 44 of this metering passage extends in, say, eight spirals or convolutions along this axial length to the righthand edge of the flange 19. At the edge of the flange 19, the groove portion 44 continuously leads into a radially spiraling groove portion 46 formed along the outer radial face of the end member 21 of rotor 16. This portion 46 spirals inwardly in the direction of rotation of rotor 16. It develops over the rotor face for, say, 8—12 convolutions, as illustrated in Fig. 2, where the grooving 46 opens to the righthand bearing recess of housing 33 in which ball bearing 35 is disposed. This recess communicates the grooving with the righthand bore portion 24 of shaft 14.

As pointed out above, the radial and circumferential clearances between the driver rotor 16 and the driven housing 33 are very restricted, for example .002 inch–.0025 inch, and the circumferential and radial spiral grooving at 44 and 46 may be of a depth of, say, .007 inch. As illustrated in Fig. 1, the hub portion 18 of rotor 16 axially abuts the roller thrust bearing 40, against which it is urged by the end thrust of centrifugally compressed hydraulic liquid traversing the spiral grooving 46.

The housing wall 34 is provided with a filler opening 48 closed by a plug 49, through which the device may be filled with hydraulic liquid.

In operation, and assuming the internal reservoir 22 of the rotor 16 to be filled with hydraulic liquid, rotation of pulley 11 drives the rotor 16 at the speed of the pulley, causing the liquid in reservoir 22 to be forced centrifugally through radial discharge ports 32 to the restricted axial space between the rotor flange 19 and housing flange 37. The liquid is forced along the spiral peripheral grooving 44 to the righthand edge of flange 19, exerting a strong hydraulic radial coupling thrust, and through the radially spiraled grooving 46, inwardly to the shaft 14, exerting a corresponding axial coupling thrust. The metered liquid flow path thus set up is controlled in the shaft zone, to limit the pressure centrifugally imposed on the liquid, by the ball check 26.

The setting of the screw 28 is such that the ball 29 will seal against valve seat 26 and prevent return of the pressurized liquid to the reservoir 22 until a critical pressure has been built up in the spiral grooving 45. This will be the pressure corresponding to the desired torque on driven housing member 34 under the hydraulic coupling forces described. Upon attaining this pressure, the ball check 29 yields to allow liquid to return to the reservoir 22. Slight slip or hydraulic shear may occur between rotor 16 and driven housing 33 at input speeds up to about 1400 R. P. M., but member 33 will rotate at substantially unchanged speed as the speed of input shaft 14 increases up to the value mentioned. This condition will obtain until the shaft speed drops to that at which the ball check is pre-set to return and close the valve seat 26. Of course, at input speeds substantially higher than 1400 R. P. M. the amount of slip will be greater.

Fig. 4 of the drawings shows a further modification of the principle of the invention, involving the use of fixed but adjustable means to meter the return of hydraulic liquid to a reservoir, as distinguished from the resiliently biased ball check 29 of Fig. 1. Inasmuch as the arrangement of parts is, in general, similar to that found in Figs. 1, 2 and 3, structural features and relationships common to the two arrangements are designated by corresponding reference numerals.

The driver rotor 16 of Fig. 4 affords a liquid reservoir 22 like that of the first embodiment. But in this case the rotor has an axial thickened lefthand, radially extending end wall 51 provided with a plurality of internal, radially disposed bores 52, in each of which elongated stem 53 of a needle valve 54 is disposed. The valve heads of these members are received in chambers 55 formed in a radially thickened outer annular flange 56 of the end wall 51, and the needle valves 54 are urged radially inwardly by small coil springs 57 in these chambers, the springs outwardly abutting the axially bored plugs 58 threaded in flange 56.

The reservoir space 22 communicates with each of the small radial chambers 55 through an inclined passage 59, which passage is thus placed in communication with the hollow bore 60 of the plug 58. The needle valve controls the size of the opening of the bore 60 in its zone of communication with the passage 59 and reservoir 22.

The extent to which the plug bore 60 is thus communicated with passage 59 is of course determined by the radial position of the needle valve. This is controlled by a wedge or cam element 62 disposed in the axial bore 63 of shaft 14, the cam element being threadedly engaged at 64 with this bore and having an inner tapered nose 65 against which the valve stems 53 are urged by the coil springs 57.

As in the first embodiment, the rotor 16 has circumferential spiral grooving 44 about its outer peripheral surface and radial spiral grooving 46 about its righthand radial face. The thus constituted grooving, generally designated 45, opens through an axial bore portion 66 of shaft 14 and radial bores 67 of the shaft to the reservoir 22.

In other respects, structural features of the two forms are similar, as indicated above. The setting of cam or wedge member 62 adjusts the needle valves 54 for the desired throttling or metering action on liquid centrifugally forced from reservoir 22, which force sets up the desired radial and end coupling thrusts to drivingly engage rotor 16 with the driven housing member 33 through the hydraulic shear of the compressed liquid.

In either of the forms described above, a highly constant torque output is produced under varying conditions of input speed and compressor load. Above a maximum critical rate of operation, slip takes place, and non-slip transmission resumes when the input speed drops below the critical value.

What I claim as my invention is:

1. A hydraulic torque transmission device comprising a driving rotor member having an internal annular liquid containing space from which liquid is centrifugally forced in the rotation of said member, and a rotatable driven member encasing said driving rotor member in the zone of centrifugal liquid discharge from said space, said rotatable members providing a sealed and laterally restricted circumferential and radially inward path of liquid return from said discharge zone to said internal space, said path being generally spiral in outline and including first and second portions arranged circumferentially and radially respectively of said driving and driven members.

2. A hydraulic torque transmission device comprising a driving rotor member having an internal annular liquid containing space from which liquid is centrifugally forced in the rotation of said member, a rotatable driven member encasing said driving rotor member in the zone of centrifugal liquid discharge from said space, said rotatable members providing a sealed and laterally restricted circumferential and radially inward path of liquid return from said discharge zone to said internal space, said path being generally spiral in outline and including first and second portions arranged circumferentially and radially respectively of said driving and driven members, and a metering check member adjustably controlling said liquid return between said second path portion and said space.

3. A transmission device in accordance with claim 2, in which said metering check member is adjustably and yieldably sustained to normally close said path.

4. A transmission device in accordance with claim 2, in which said metering check member is adjustably and yieldably sustained on said driving rotor member to normally close said path.

5. A transmission device in accordance with claim 2, in which said metering check member comprises a valve on said driving rotor member acting radially thereof to control flow of liquid in said path.

6. A transmission device in accordance with claim 2, in which said metering check member comprises a valve on said driving rotor member acting radially thereof to control flow of liquid in said path at said discharge zone.

7. A transmission device in accordance with claim 2, in which said metering check member comprises a valve on said driving rotor member acting radially thereof to control flow of liquid in said path at said discharge zone, and an axially adjustable member on said rotor member controlling the radial position of said valve.

8. A centrifugal and hydraulic torque transmission device comprising a driving rotor having an internal annular reservoir ported radially outwardly for the centrifugal forcing of liquid from said reservoir in the rotation of said rotor, and a rotatable driven housing member encasing said rotor circumferentially in a zone of centrifugal exit from said reservoir and in a radial zone communicating with said circumferential zone, so as to provide a sealed and laterally restricted path of radial inward return from said zone to said reservoir to be traversed by liquid centifugally pressurized predeterminedly, said path including communicating generally spiral circumferential and radial formations between said rotor and driven member.

9. A centrifugal and hydraulic torque transmission device comprising a driving rotor having an internal annular reservoir ported radially outwardly for the centrifugal forcing of liquid from said reservoir in the rotation of said rotor, and a rotatable driven housing member encasing said rotor circumferentially in a zone of centrifugal exit from said reservoir and in a radial zone communicating with said circumferential zone so as to provide a sealed and laterally restricted path of radial inward return from said zone to said reservoir to be traversed by liquid centifugally pressurized predeterminedly, said path including communicating generally spiral circumferential and radial formations on said rotor.

10. A centrifugal and hydraulic torque transmission device comprising a driving rotor having an internal annular reservoir ported radially outwardly for the centrifugal forcing of liquid from said reservoir in the rotation of said rotor, a rotatable driven housing member encasing said rotor circumferentially in a zone of centrifugal exit from said reservoir and in a radial zone communicating with said circumferential zone, so as to provide a sealed and laterally restricted path of radial inward return from said zone to said reservoir to be traversed by liquid centifugally pressurized predeterminedly, said path including communicating generally spiral circumferential and radial formations on said rotor, and an adjustable check member predeterminedly resisting said return.

11. A hydraulic torque transmission device comprising a power shaft, a driving rotor member keyed to said shaft and having an internal annular liquid containing space provided at its periphery with one or more radially extending discharge ports from which liquid is centrifugally forced during rotation of said member, said shaft having an axial passage, said shaft and said rotor member having connecting radial passages in communication with said axial passage and said liquid containing space, a rotatable driven member encasing said driving rotor member in the zone of centrifugal liquid discharge, said rotatable members providing a sealed and restricted path of liquid return from said discharge zone to the axial passage in said shaft, said path including a continuous pressure metering passage, and means for controlling the flow of liquid from said metering passage to the liquid containing space in said rotor member, including a member within the axial passage in said shaft.

12. A hydraulic torque transmission device comprising a power shaft, a driving rotor member keyed to said shaft and having an internal annular liquid containing space provided at its periphery with one or more radially extending discharge ports from which liquid is centrifugally forced during rotation of said member, said shaft having an axial passage, said shaft and said rotor member having connecting radial passages in communication with said axial passage and said liquid containing space, a rotatable driven member encasing said driving rotor member in the zone of centrifugal liquid discharge, said rotatable members providing connected sequentially arranged circumferential and radial restricted paths of liquid return from said discharge zone to the axial passage in said shaft, said paths including connecting sequentially arranged circumferential and radial pressure metering passages, and means for controlling the flow of liquid from said connecting metering passages to the liquid containing space in said rotor member, including a member within the axial passage in said shaft.

13. A hydraulic torque transmission device comprising a power shaft, a driving rotor member keyed to said shaft and having an internal annular liquid containing space provided at its periphery with one or more radially extending discharge ports from which liquid is centrifugally forced during rotation of said member, said shaft having an axial passage, said shaft and said rotor member having connecting radial passages in communication with said axial passage and said liquid containing space, a rotatable driven member encasing said driving rotor member in the zone of centrifugal liquid discharge, said rotatable members providing connected sequentially arranged circumferential and radial restricted paths of liquid return from said discharge zone to the axial passage in said shaft, said paths including connecting sequentially arranged circumferential and radial spiraling pressure metering passages, and means for controlling the flow of liquid from said connecting metering passages to the liquid containing space in said rotor member, including an adjustable member within the axial passage in said shaft.

14. A hydraulic torque transmission device comprising a power shaft, a driving rotor member keyed to said shaft, said rotor member having left hand and right hand radial walls and provided between said walls with an internal annular liquid containing space provided at its periphery adjacent the left hand radial wall of said rotor with one or more radially extending discharge ports from which liquid is centrifugally forced during rotation of said member, said shaft having an axial passage, said shaft and said rotor member having connecting radial passages in communication with said axial passage and said liquid containing space, a rotatable driven member encasing said driving rotor member in the zone of centrifugal liquid discharge, said rotatable members providing a sealed and restricted path of liquid return from said discharge zone to the axial passage in said shaft, said path including a continuous pressure metering passage, and means associated with the axial passage in said shaft for controlling the flow of liquid between said pressure metering passage and the liquid containing space in said rotor member.

15. A hydraulic torque transmission device comprising a power shaft, a driving rotor member keyed to said shaft and having an internal annular liquid containing space provided at its periphery with one or more radially extending discharge ports from which liquid is centrifugally forced during rotation of said member, said shaft having an axial passage, said shaft and said rotor member having connecting radial passages in communication with said axial passage and said liquid containing space, a rotatable driven member encasing said driving rotor member in the zone of centrifugal liquid discharge, said rotatable members providing a sealed and restricted path of liquid return from said discharge zone to the axial passage in said shaft, said path including a continuous pressure metering passage, and means for controlling the flow of liquid from said metering passage to the liquid containing space in said rotor member.

16. A hydraulic torque transmission device comprising a driving rotor member having an internal annular liquid containing space provided with one or more radially extending discharge ports from which liquid is centrifugally forced in the rotation of said member, and a rotatable driven member encasing said driving rotor member in the zone of centrifugal liquid discharge from said space, said rotatable members providing connected sequentially arranged circumferential and radial restricted paths of liquid return from said discharge zone to said internal space, said paths including connecting sequentially arranged circumferential and radial pressure metering passages.

17. A hydraulic torque transmission device comprising a driving rotor member having left hand and right hand radial walls and provided between said walls with an internal annular liquid containing space provided at its periphery adjacent the left hand radial wall of said rotor with one or more radially extending discharge ports from which liquid is centrifugally forced in the rotation of said member, and a rotatable driven member encasing said driving rotor member in the zone of centrifugal liquid discharge from said space, said rotatable members providing connected sequentially arranged circumferential and radial restricted paths of liquid return from said discharge zone to said internal space, said paths including connecting sequentially arranged circumferential and radial spiraling pressure metering passages.

18. A hydraulic torque transmission device comprising a driving rotor member having substantially parallel radial walls and provided between said walls with an internal annular liquid containing space provided at its periphery adjacent one of said radial walls with one or more radially extending discharge ports from which liquid is centrifugally forced in the rotation of said member, a rotatable driven member encasing said driving rotor member in the zone of centrifugal liquid discharge from said space, said rotatable members providing connected sequentially arranged circumferential and radial restricted paths of liquid return from said discharge zone to said internal space, said paths including connecting sequentially arranged circumferential and radial pressure metering passages, and a metering check member between said radial metering passage and said internal space adjustably controlling said liquid return.

References Cited in the file of this patent

UNITED STATES PATENTS

| 2,253,001 | Webb et al. | Aug. 19, 1941 |

FOREIGN PATENTS

| 178,140 | Great Britain | Apr. 5, 1922 |
| 483,798 | Italy | Aug. 11, 1953 |
| 1,015,293 | France | July 2, 1952 |